Patented Aug. 6, 1946

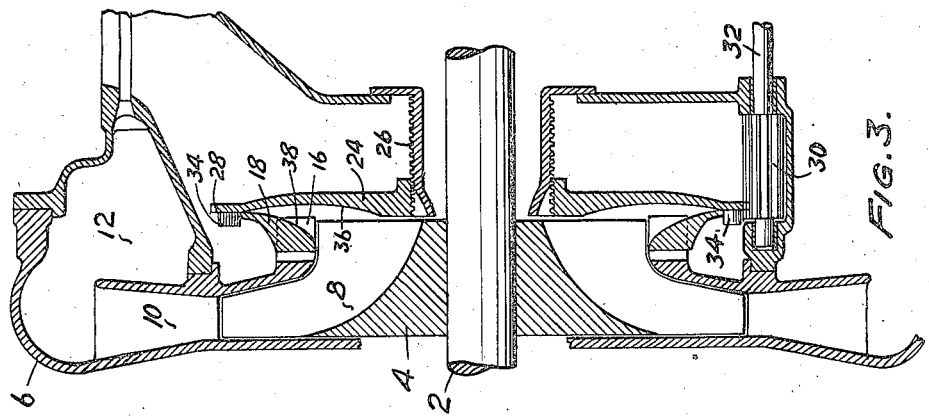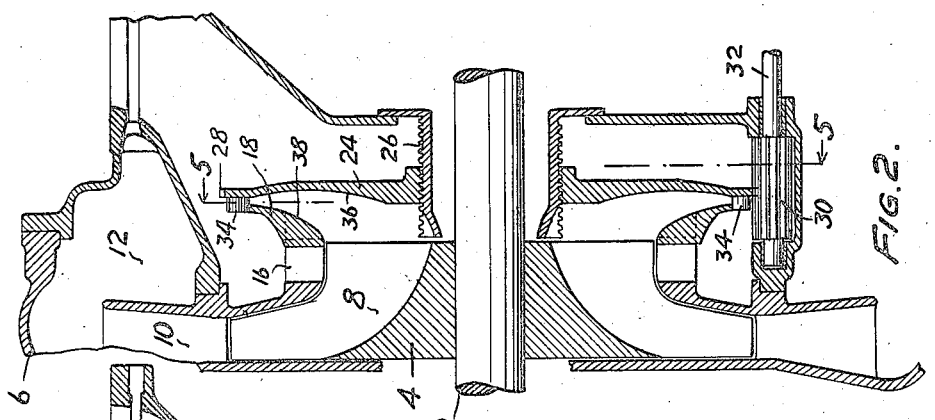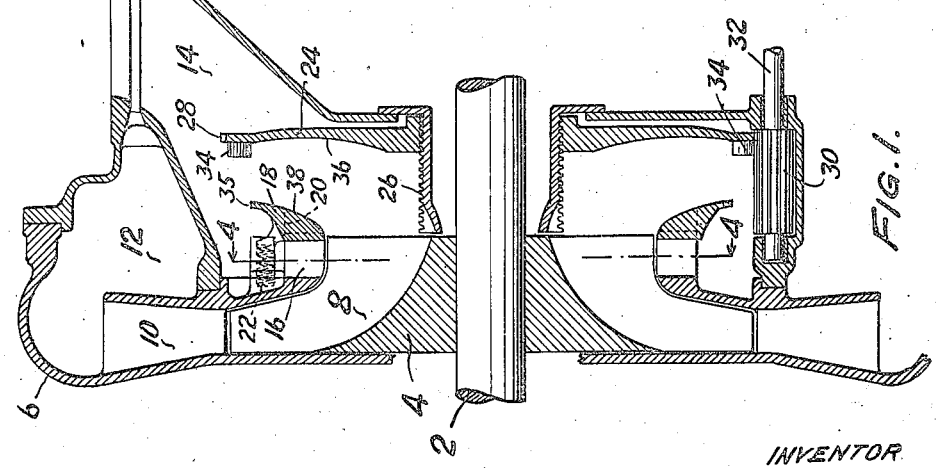

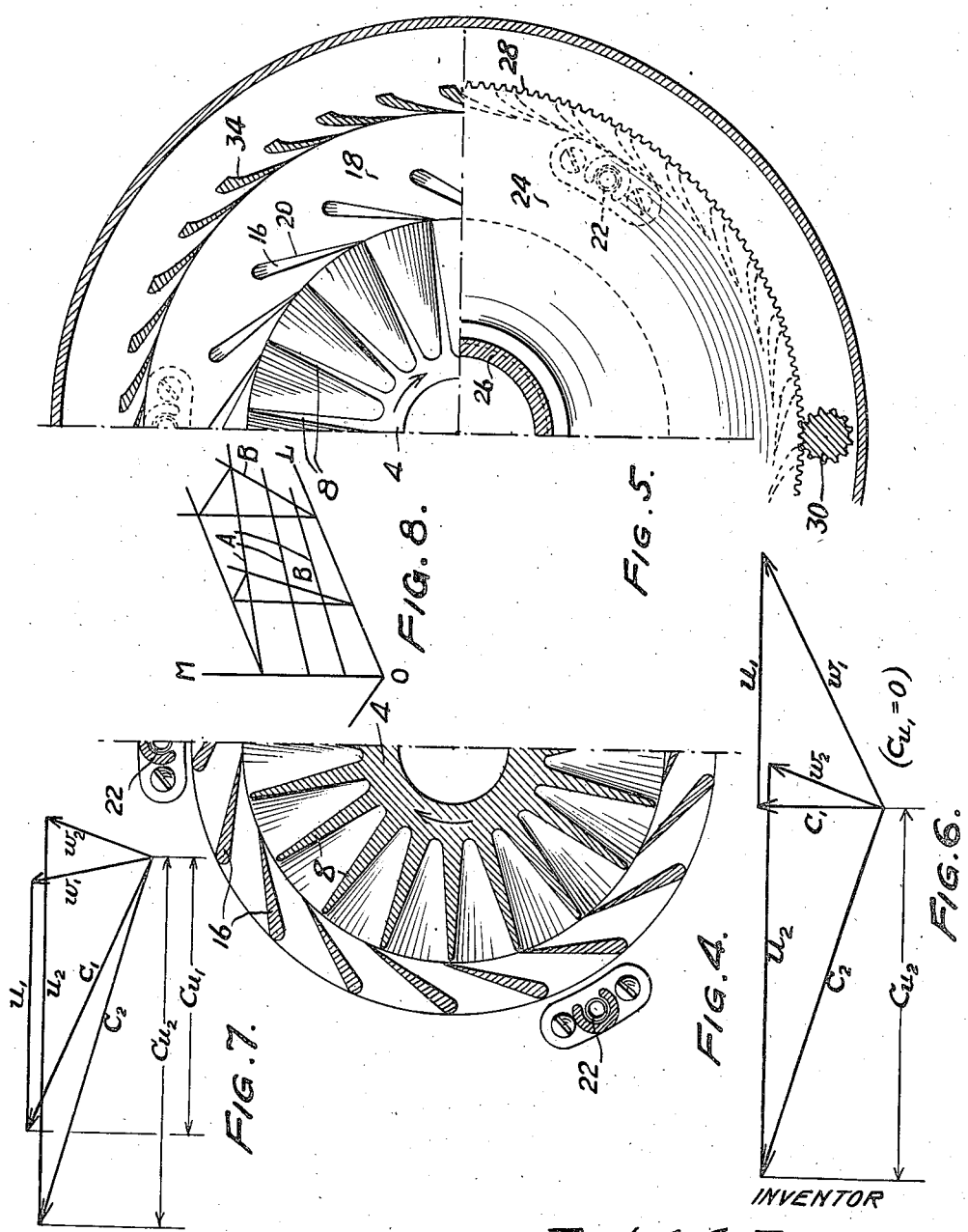

2,405,282

UNITED STATES PATENT OFFICE 2,405,282

VARIABLE RATIO COMPRESSOR

Rudolph Birmann, Newtown, Pa., assignor, by mesne assignments, to Federal Reserve Bank of Philadelphia, a corporation of the United States of America Application February 2, 1938, Serial No. 188,231

8 Claims. (Cl. 230—47)

This invention relates to a variable compression ratio centrifugal compressor, and particularly to a compressor of that type adapted to be driven at constant speed and used for the supercharging of aircraft engines.

All modern aircraft engines of medium and large sizes are equipped with gear driven superchargers that are commonly built into the engine as an integral part thereof. These superchargers have two purposes. First, they are designed to increase the manifold pressure to crowd more oxygen and fuel into the cylinders to thereby increase the charge density and the horsepower output of the engine. Secondly, they are designed to maintain a certain manifold pressure, and thereby the horsepower developed by the engine, at high altitudes where the pressures and densities of the air are reduced to such extent that without a supercharger there would result a rapid decrease of power output of the engine with increased altitudes. For example, whereas at sea level the absolute pressure of the atmosphere may be 30 inches of mercury and the temperature 60° F., at 35,000 feet at the same time the pressure may be 7 inches of mercury and the temperature —66° F.

So far as the design of a centrifugal compressor is concerned, the aforementioned duties do not offer any particular problem. There is, however, a difficulty which has given the aircraft engine designer a considerable amount of trouble, and the elimination of which has been the object of much developmental and experimental work.

This difficulty is due to the fact that a given supercharger operating at a constant speed can be practically designed to give a certain manifold pressure at one altitude only. At higher altitudes this manifold pressure will drop and the horsepower of the engine will fall off as a consequence. Again, without resorting to throttling its suction at lower altitudes, the supercharger discharge pressure increases to such extent that the engine cannot stand the increased power output that would result. Throttling has, therefore, been necessary to prevent the manifold pressure from exceeding a maximum safe value.

In throttling at the lower altitudes, the air and gas mixture is admitted to the supercharger at approximately a pressure equal to the one that exists at the altitude for which the supercharger is designed. However, at the designed altitude the air temperature is very much lower than it is at or near sea level, and since the pressure ratio, and consequently the temperature ratio, produced by any constant speed centrifugal compressor are practically constant, and also since throttling of the suction does not bring about a temperature reduction of the air entering the supercharger, the manifold temperature is greatly increased.

High manifold temperature, however, cannot be tolerated, because it results in overheating of the cylinders, burning of the exhaust valves, destructive preignition or detonation, and loss of power due to the high specific volume of the air in the manifold. Hence, to make operation of an altitude supercharger equipped engine at all possible near sea level, it has been necessary to limit its power output to substantially less than full power. In other words, at sea level where maximum power should be available, the engine develops less power than at the altitudes for which the arrangement is properly designed.

To avoid these difficulties, the following schemes have been proposed:

First, superchargers have been driven by the engine not with a constant speed up gear ratio, but by means of a gear arrangement that permits two or more speed up ratios so that the supercharger can be operated at a lower speed, and consequently at a lower pressure and temperature ratio, at or near sea level and a higher speed at a higher altitude to suit the pressure and temperature conditions existing thereat. A continuously variable speed up gear has been proposed to give the best results.

Secondly, a supercharger has been proposed with two or more stages, only one of which, the last one, is used at sea level, while the others are made operative at higher altitudes where the increased pressure ratios so obtained are required to maintain the manifold pressures. Obviously, the increase in pressure ratio can only be secured in steps.

Third, it has been proposed that the pressure at the impeller inlet may be lowered, but instead of doing this by throttling it is to be done by expansion in a turbine. Accordingly, the temperature at the impeller inlet, and consequently the discharge temperature, are reduced and some of the power required to drive the compressor is saved, being reduced by the amount that is obtainable from the expansion in the turbine. This arrangement, however, is not only structurally complicated, but is incapable of giving efficiently a large range of compression ratios such as is required for normal aircraft operation, the reason being the occurrence of excessive power losses due to the existence of improperly directed passages for operation outside a limited compression ratio range. Furthermore the arrangement involves large impact losses.

All of the above arrangements are quite complicated, cumbersome, heavy and expensive and have not been practical for general adoption.

It is the object of the present invention to avoid the difficulties above mentioned by the utilization of an arrangement of simple type in which the pressure ratio of a centrifugal compressor operating at constant speed may be changed by simple adjustments of parts which are normally stationary during operation and without any modification of a conventional rotor construction and without the addition of any conventional parts rotating at high speeds, for example, turbine rotors, which involve large energy losses by increase in the number of entrances and exits for the air besides providing for only a limited range of over-all compression ratios. Specifically, the object is accomplished by modifying inlet conditions without throttling and its objectionable consequences in accordance with principles hereafter disclosed, while at the same time securing in fashion a long range of compression ratios.

The accomplishment of this general object, and of more specific objects, relating primarily to details of arrangement and construction, will be apparent from the following description read in conjunction with the accompanying drawings, in which:

Figures 1, 2 and 3 are axial sections through an impeller construction embodying the principles of the invention, the several figures showing various conditions of adjustment to secure different pressure ratios;

Figure 4 is a transverse section taken on the plane indicated at 4—4 in Figure 1;

Figure 5 is a section taken on the broken plane indicated at 5—5 in Figure 2;

Figures 6 and 7 are vector diagrams illustrating approximately the respective velocity conditions accompanying operations according to the adjustments of Figures 1 and 3; and Figure 8 is a diagrammatic view illustrating the nature of the blading preferably used.

To enable the principles of the invention to be understood, a general explanation of the theory may be made as follows:

If it is assumed that there are no friction or flow losses, the pressure rise produced by a centrifugal compressor is expressed by the well known equation:

$$\frac{\Delta p}{\gamma} = \frac{1}{g}(u_2 c_{u2} - u_1 c_{u1})$$

in which:

$u_1$ is the peripheral velocity of the impeller at the entrance,
$c_{u1}$ is the peripheral component of the absolute fluid velocity at the entrance,
$u_2$ is the peripheral velocity of the impeller at the discharge,
$c_{u2}$ is the peripheral component of the absolute fluid velocity at the discharge,
$\Delta p$ is the total pressure rise, $p_2 - p_1$,
$\gamma$ is the mean specific weight of the fluid, and
$g$ is the acceleration due to gravity.

The significance of these and other quantities may be seen by a preliminary reference to Figures 6 and 7, in which flow conditions in a centrifugal compressor are represented in conventional vector diagrams, in which there are indicated not only $u_1$, $u_2$, $c_{u1}$, and $c_{u2}$, defined above, but also $c_1$, the absolute fluid velocity at the entrance, $c_2$, the absolute fluid velocity at the discharge, $w_1$, the velocity of the fluid relative to the impeller at the entrance, and $w_2$, the velocity of the fluid relative to the impeller at the discharge. These vector diagrams will be discussed more fully hereafter.

The above formula, which represents a close approximation to normal conditions which are encountered, indicates that the pressure rise depends exclusively on the inlet and discharge conditions and is independent of the path of flow between the inlet and discharge. Since normally it is desirable to obtain the maximum possible pressure rise from a wheel of given outside diameter and eye diameter at a given speed of rotation, the negative term of the above formula is made zero by so arranging the construction that the absolute inlet velocity is perpendicular to the face of the impeller so that its peripheral component $c_{u1}$ is zero. This construction, of course, has the further advantage of obviating the necessity for suction guide vanes because the flow corresponding to such condition of the absolute inlet velocity is the normal inlet flow to the impeller.

In accordance with the present invention, the second term of the above formula is made positive to an adjustable extent serving to cut down the pressure rise, and consequently the pressure ratio, to the desired amount at lower altitudes, while for operation at the designed altitude, this term is made zero so that the compressor functions in its most efficient normal manner. The values of $u_1$ and $u_2$ are fixed by the ranges of inlet and discharge radii of the impeller. $c_{u1}$ and $c_{u2}$ depend, respectively, on the arrangement of inlet and discharge passages with respect to the passages of the rotor. Since in general design considerations make it impractical to vary the discharge passages, there is left for practical variation the arrangement of the inlet approach passages whereby the quantity $c_{u1}$ may be controlled, to vary from its normal zero value to such values as will serve to make the second term of the above equation sufficiently large.

By doing the above, it is possible to have the impeller function in quite conventional fashion, with axial flow through the inlet approach passages, when the maximum pressure ratio is desired, with maximum efficiency and minimum losses at high altitudes, while when a low compression ratio is desired, this is secured merely by changing the direction of inlet flow to give an increase of the peripheral component of the absolute velocity. Doing this involves no increase in impact losses nor throttling over a large range of compression ratios as will be evident hereafter. This may be contrasted with the inevitable impact losses in the turbine-impeller arrangement referred to above, which additionally has only a small range of moderately efficient operation and is particularly unsatisfactory for high compression ratio conditions since the air at all times passes through the turbine.

Before discussing further matters of the theory of operation reference may be made to a desirable mechanical embodiment of the invention illustrated in the drawings.

At 2 there is illustrated a shaft of a centrifugal compressor adapted to be driven at substantially constant speed by the engine which drives the airplane propeller and which is being supercharged. The shaft 2 carries the impeller 4, of substantially conventional type, rotating within a suitable housing 6, providing intake and discharge passages, and provided with passages indicated at 8, of which more will be said later. Discharge from the impeller passages 8 takes place through a suitable diffuser 10 into the passage 12 from which the compressed air may be delivered to the engine to be supercharged.

The supply of air to the compressor takes place through 14. At the normal altitude for which design is made substantially all of the air thus entering flows axially to the impeller passages 8 giving rise to a zero value of $c_{u1}$. Consequently, the second term of the above equation is zero and a maximum compression ratio is secured, the impeller operating in conventional, highly efficient fashion.

Unlike conventional compressor arrangements, the entrance portions of the impeller passages 8 are not surrounded by an annular closure wall; but, on the contrary, there are provided around these portions of the impeller passages guide vanes 16 extending in the direction indicated in Figure 4. An annular ring 18 is slotted as indicated at 20, the slots being formed to fit the vanes 16 so that the ring may move axially over the vanes. The ring is urged outwardly by compression springs indicated at 22 to a position limited by suitable stops formed by the semicylindrical elements housing the springs.

A plate 24 is threaded upon a fixed hub 26 and is provided at its periphery with gear teeth 28 meshing with an elongated pinion 30 mounted upon a shaft 32 which may be rotated manually for adjustment purposes. Rotation of the shaft 32 will cause the plate 24 to move axially between the limiting positions indicated in Figures 1 and 3. At its periphery the plate 24 carries a series of guide vanes 34 of the form illustrated in Figure 5, the inner ends of which are designed to fit over the periphery 35 of the ring 18, the arrangement being such that movement of the plate 24 to the left, as viewed in the successive Figures 1, 2 and 3, will first cause the vanes 34 to be located adjacent the ring 18 and then will cause the plate 24 to engage the ring 18, moving it to the left hand limiting position indicated in Figure 3 against the compressed springs 22. The ring 18 and the plate 24 are provided with guide surfaces 38 and 36 designed for the smooth guidance of air to the impeller inlet during normal operation.

The normal high altitude condition of the compressor is illustrated in Figure 1. Under such conditions the plate 24 is moved to its extreme right hand position as viewed in that figure, providing a large open passage for the air flowing from 14 to the radially extending inlet lips of the impeller passages 8. At such time the guide passages between the vanes 16 are fully open but due to the comparatively small passage area and also due to the normal inlet flow in an axial direction, little if any air flows through these passages and the operation is the same as if the portion of the impeller at the location of these passages was surrounded by a closed wall. The guide vanes 34 interrupt only a relatively insignificant portion of the intake passage and consequently do not substantially influence the inflowing air, which, accordingly, passes to the impeller in an axial direction, giving rise to operation at the maximum compression ratio.

If the altitude is decreased, the high compression ratio previously resulting may be too great, resulting in the production of too high a pressure in the intake manifold, accompanied by an undesirable rise in temperature over that effected by the compression at the same compression ratio at higher altitudes where lower temperatures prevail. Consequently, adjustment is made by rotation of the shaft 32 to move the plate 24 to the left, causing the vanes 34 to obstruct more and more of the inlet passage eventually arriving at the condition illustrated in Figure 2. As the vanes approach the ring 18 a greater proportion of the inflowing air must flow between them and they will impart to the air entering the impeller a swirling motion in the direction of rotation of the impeller. This action is accomplished without throttling, the energy of the inflowing air being converted into kinetic energy rather than into heat as in the case of throttling. As a result of this action the entering air now moves in a spiral direction in its approach to the impeller inlet, and consequently the peripheral component of the absolute fluid velocity at the entrance, namely $c_{u1}$, takes on a positive value with the result that the second term of the above formula decreases the value of the pressure rise. The pressure ratio is thereby decreased to the proper extent in a continuous fashion from its maximum value attained by the adjustment in Figure 1 through the approach to the condition of adjustment illustrated in Figure 2.

There is a limit, however, to the rotational velocity which it is desirable to impart to the inflowing air by this action of the vanes 34. The limit is achieved when, due to the action of the inlet swirl, the impeller passages at the normal entrance receive the air at an angle that is approximately about 15° larger than the vane angle which is designed to be correct for the quite open suction condition applying at high altitudes. As will be pointed out hereafter, the impeller vanes are preferably of a type presenting straight line elements in the direction of flow and are streamlined at their intake edges. Owing to this fact, each vane acts very much like an airfoil. It is known that a suitable airfoil can work efficiently and develop maximum lift with an angle of incidence of about 15°. It will be obvious, therefore, that the angle of 15° or less with which the entrance air blows against the trailing side of the vanes does not constitute a shock angle, but, owing to the airfoil characteristic of the vanes, they will deflect the entering air in the proper manner to result in a substantial driving component at the entrance tending to provide a net reduction of the power necessary to drive the compressor. At angles greater than 15° the airfoil effect rapidly drops off so that, as just indicated, an entrance angle of about 15° greater than the vane angle represents the limiting condition desirably achieved through the action of the vanes 34.

As a specific example of the above, the inlet angle of the vanes corresponding exactly to the angle of the relative inlet velocity under the conditions of operation of Figure 1 may be 20°. In the approach to the condition of Figure 2, due to the increase in the absolute velocity of the air, the proper value for the inlet angle will increase to a value of, for example, 35–40° when the condition of Figure 2 is secured. Such an angle, being only 15°–20° larger than the provided angle of 20°, will, nevertheless, be consistent with satisfactory operation due to the fact that the air does not strike the impeller vanes at an angle greater than the permissible one considering its airfoil characteristics. However, if the design is made for normal high altitude operation a sufficient increase in the value of $c_{u1}$ to satisfactorily reduce the pressure ratio at low altitudes would result in an inlet angle requirement of from 45°–120°. A flow angle of such values would create high impact losses and very unsatisfactory operation. Consequently there now comes into operation the effect of the guide vanes 16. As will be obvious from Figures 2 and 3, a movement of the plate 24 to the left beyond the position of Figure 2 will first result in cutting off the passages between the vanes 34, and then the movement of the ring 18 against the action of the springs 22 to cut down the cross-sectional areas of the passages between the vanes 16, this taking place until there is reached the limiting condition illustrated in Figure 3.

After passage to the normal entrance of the impeller is very substantially reduced or cut off, as illustrated in Figure 2, for example, auxiliary or exclusive entrance of air takes place through the passages defined by the vanes 16 between the peripheral portions of the entrance ends of the impeller vanes 8. The average direction of flow through the passages defined by the vanes 16 when the passages are in their most fully open position is such as to approximate as closely as possible impactless entrance between the vanes 8 of the impeller, which have radially extending inlet edges adjacent the vanes 16. The net result is a still further increase in the last term of the above formula, thereby further cutting down the compression ratio for sea level conditions. By continued decrease of the passages between the blades 16 the velocity $c_1$ is increased to such an extent that if no supercharging is to be attempted the compression ratio may be unity. As the velocity is increased beyond the wide open condition of the passages between the blades 16, and the velocity $c_1$ increases, there again enters into the situation the airfoil characteristics of the vanes with the result that shockless entrance of the air occurs though the relative flow angle may increase to 105° to 110°. In case a still larger angle is required, a smooth inlet flow may be provided by slight curvature of the inlet edges of the vanes adjacent the finally active portions of the passages 16, or alternatively, smooth entrance may be obtained by the arrangement described in my application Serial No. 176,979, filed November 29, 1937.

Since, when the compression ratio is unity, no compression is taking place the compressor does no work, and consequently does not absorb power except for that incidental to the losses of its idle operation. By means of a design such as that illustrated, for example, it is possible to attain a continuous variation in compression ratio from, say, 2.2 to 1. Under the last named condition the unavoidable flow losses result in a certain power consumption which is only a small fraction of the power that would have to be expended if the discharge pressure were reduced to the same value by means of suction throttling, in which case power consumption remains practically constant at its full load value.

The extreme conditions described above are graphically illustrated in Figures 6 and 7. Referring first to the former, it illustrates the relationships of the various velocities under consideration corresponding to the adjustment of Figure 1 for high altitude operation. $c_1$, representing the absolute fluid velocity at the entrance, extends axially and has no peripheral component so that the second term of the equation given above is zero. The relative velocity $w_1$ resulting from the peripheral velocity $u_1$ at the entrance is related to it and the absolute entrance velocity as illustrated in the triangle. At the discharge the peripheral velocity is $u_2$ and the absolute discharge velocity is $c_2$. The relative velocity is $w_2$.

At sea level, on the other hand, the conditions indicated in Figure 7 may prevail. The correspondence of the various velocities to those indicated in Figure 7 will be obvious. The principal change is that $c_1$, the absolute velocity at the entrance, now has a very considerable peripheral component due not only to its absolute value, but also to its direction. Consequently, the second term of the equation given above is relatively small. It will be noted also from the vector diagram that the ratio of $w_1$ to $w_2$ is small, approximating unity, so that there is very little compression taking place. By suitable design it will be obvious that any intermediate conditions may be secured, these being obtained in the adjustment from the condition of Figure 1 to the condition of Figure 3 by the gradual change in the direction and absolute value of $c_1$. Note that the inlet angle theoretically required in Figure 7 is less than the vane angle of 90° plus the permissible shock angle.

It will be noted that the matter of the resulting temperature is automatically taken care of by the above arrangement. When the temperature is low, as at high altitudes, and a high compression ratio is used, the temperature is substantially raised to a satisfactory extent. On the other hand, at low altitudes where the compression ratio approaches unity, little temperature rise will occur; and in the case of the extreme condition illustrated in Figure 3 with a pressure ratio of substantial unity, the temperature rise above the temperature of the entering gases is quite small and is due primarily to friction conditions being well within the upper limits which are permissible.

The impeller blades are preferably designed in accordance with the considerations indicated in my application Serial No. 176,979, filed November 29, 1937, and my Patents Nos. 1,926,225 and 1,959,703, dated September 12, 1933, and May 22, 1934, respectively. In Figure 8 there is illustrated (in a fashion similar to Figure 8 of my Patent 1,959,703) the nature of the blades and passages. In this figure OL represents the axis of rotation and OM a radial line defining the origin of a blade. As described in said patent, there are two sets of straight lines involved in the design, the straight lines A of one set extending in the direction of normal flow during entrance under normal conditions in an axial direction, while the straight lines B extend radially as indicated. The two sets indicate the actual fact that the blades are built up on relatively flat surfaces of smooth form so that entrance may take place inwardly as provided by the vanes 16 with the insurance of smooth flow. As pointed out in my application above mentioned, the proper choice of entrance lip in the case of turbine passages based on my improved construction may be used to achieve the result of impactless entrance and desired relationships between peripheral velocity of the turbine passages and spouting velocity of the driving gases. This principle may be obviously embodied as indicated above in the design of the lips of the impeller passages where they receive air from the passages defined by the guide vanes 16 so as to secure proper flow as the passages 16 are reduced in cross-sectional area in the adjustment between the positions of Figures 2 and 3. Both at the normal radial entrance edge, and where entrance occurs from the vanes 16, the blades are provided with airfoil type edges to secure impactless entrance through the substantial ranges of approach angles mentioned above. Thus the vanes form acute angles with axial planes and extend substantially along straight lines in the direction of flow from their entrance portions to their discharge portions and are provided with airfoil type edges at their entrance portions to provide smooth entrance and flow over said vanes through substantial ranges of approach angles of flow.

What I claim and desire to protect by Letters Patent is:

1. A centrifugal compressor having a variable compression ratio comprising a rotor provided with impeller vanes defining gas passages, and means for varying the peripheral component of the absolute velocity of the gas at the entrance to said passages, said vanes forming acute angles with axial planes and extending substantially along straight lines in the direction of flow from their entrance portions to their discharge portions and being provided with airfoil type edges at their entrance portions to provide smooth entrance and flow over said vanes through substantial ranges of approach angles of flow.

2. A centrifugal compressor having a variable compression ratio comprising a rotor provided with impeller vanes defining gas passages, and normally stationary but adjustable means for varying the peripheral component of the absolute velocity of the gas at the entrance to said passages, said vanes forming acute angles with axial planes and extending substantially along straight lines in the direction of flow from their entrance portions to their discharge portions and being provided with airfoil type edges at their entrance portions to provide smooth entrance and flow over said vanes through substantial ranges of approach angles of flow.

3. A centrifugal compressor having a variable compression ratio comprising a rotor provided with impeller vanes defining gas passages, said gas passages being provided with inlet portions arranged to normally receive gas approaching them in an axial direction, and means adjustable to control flow to said inlet portions to provide either substantially axial flow thereto, or flow having a variable peripheral component in the direction of rotation of the rotor, said vanes forming acute angles with axial planes and extending substantially along straight lines in the direction of flow from their entrance portions to their discharge portions and being provided with airfoil type edges at their entrance portions to provide smooth entrance and flow over said vanes through substantial ranges of approach angles of flow.

4. A centrifugal compressor having a variable compression ratio comprising a rotor provided with impeller vanes defining gas passages, said vanes having one series of inlet edge portions arranged to receive gas approaching them in an axial direction, and another series of inlet edge portions arranged to receive gas approaching them with a radially inward component of flow, means adjustable to control flow to the first mentioned series of inlet edge portions to provide either substantially axial flow thereto or flow having a variable peripheral component in the direction of rotation of the rotor, means adjustable to control flow to the second series of inlet edge portions to provide varying velocity of flow of gas thereto, and means for controlling both of said adjustable means for their successive operation to provide progressive variation of the peripheral component of the absolute velocity of flow to the passages.

5. A centrifugal compressor having a variable compression ratio comprising a rotor provided with impeller vanes defining gas passages, said vanes having one series of inlet edge portions arranged to receive gas approaching them in an axial direction, and another series of inlet edge portions arranged to receive gas approaching them with a radially inward component of flow, means adjustable to control flow to the first mentioned series of inlet edge portions to provide either substantially axial flow thereto or flow having a variable peripheral component in the direction of rotation of the rotor, and means adjustable to control flow to the second series of inlet edge portions to provide varying velocity of flow of gas thereto.

6. A centrifugal compressor having a variable compression ratio comprising a rotor provided with impeller vanes defining gas passages, said vanes having one series of inlet edge portions arranged to receive gas approaching them in an axial direction, and another series of inlet edge portions arranged to receive gas approaching them with a radially inward component of flow, and means for controlling flow to both said series of inlet edge portions to secure different peripheral components of the absolute velocity of flow thereto.

7. A centrifugal compressor having a variable compression ratio comprising a rotor provided with impeller vanes defining gas passages, and means for varying the peripheral component of the absolute velocity of the gas at each of a plurality of series of inlet edge portions of said vanes, the inlet edge portions of one series having inlet angles substantially different from those of the inlet edge portions of the other series, the passages receiving at one of said series of inlet edge portions the major portion of the gas during operation within one range of peripheral components of the absolute velocity, and receiving at another of said series of inlet edge portions the major portion of the gas during operation within another range of peripheral components of the absolute velocity.

8. A centrifugal compressor having a variable compression ratio comprising a rotor provided with impeller vanes defining gas passages, and normally stationary but adjustable means for varying the peripheral component of the absolute velocity of the gas at each of a plurality of series of inlet edge portions of said vanes, the inlet edge portions of one series having inlet angles substantially different from those of the inlet edge portions of the other series, the passages receiving at one of said series of inlet edge portions the major portion of the gas during operation within one range of peripheral components of the absolute velocity, and receiving at another of said series of inlet edge portions the major portion of the gas during operation within another range of peripheral components of the absolute velocity.

RUDOLPH BIRMANN.